(12) United States Patent
Takei

(10) Patent No.: US 9,024,933 B2
(45) Date of Patent: May 5, 2015

(54) ELECTRONIC PAPER AND ELECTRONIC PAPER RECORDING SYSTEM USING LIGHT RECEIVING ELEMENTS

(75) Inventor: Yoshiki Takei, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 13/588,410

(22) Filed: Aug. 17, 2012

(65) Prior Publication Data

US 2013/0050169 A1 Feb. 28, 2013

(30) Foreign Application Priority Data

Aug. 31, 2011 (JP) .................................. 2011-188723

(51) Int. Cl.
| | | |
|---|---|---|
| G02F 1/133 | (2006.01) | |
| G02F 1/167 | (2006.01) | |
| G09G 3/34 | (2006.01) | |
| G02F 1/1339 | (2006.01) | |

(52) U.S. Cl.
CPC ............ *G02F 1/13318* (2013.01); *G09G 3/344* (2013.01); *G09G 2360/141* (2013.01); *G02F 1/13394* (2013.01); *G02F 1/167* (2013.01); *G02F 2201/40* (2013.01); *G02F 2203/01* (2013.01)

(58) Field of Classification Search
CPC ....... G06F 3/042; G06F 3/041; G06F 3/0412; G06F 3/03545; G06F 3/03542; G06F 3/0317; G09G 3/344; G09G 3/3433; G09G 2360/14; G09G 2360/141; G02F 1/13318; G02F 1/13394; G02F 1/167; G02F 2001/1672

USPC .................. 345/173–179, 204–211, 107; 250/458.1, 216; 257/59; 438/22
See application file for complete search history.

(56) References Cited

U.S. PATENT DOCUMENTS

| | | | | |
|---|---|---|---|---|
| 6,747,290 | B2 * | 6/2004 | Yamazaki et al. ............... | 257/59 |
| 2005/0179678 | A1 | 8/2005 | Nose et al. | |
| 2005/0266590 | A1 * | 12/2005 | Roh et al. ......................... | 438/22 |
| 2008/0036730 | A1 * | 2/2008 | Ikeda et al. .................... | 345/107 |
| 2008/0203279 | A1 * | 8/2008 | Kobashi ......................... | 250/216 |
| 2008/0259432 | A1 * | 10/2008 | Kawai et al. .................. | 359/271 |
| 2010/0079390 | A1 * | 4/2010 | Tomoda et al. ............... | 345/173 |
| 2010/0123673 | A1 * | 5/2010 | Nam .............................. | 345/173 |
| 2012/0098741 | A1 * | 4/2012 | Kim et al. ..................... | 345/107 |
| 2012/0249490 | A1 * | 10/2012 | Lee et al. ...................... | 345/179 |

FOREIGN PATENT DOCUMENTS

| | | |
|---|---|---|
| JP | A-2004-117809 | 4/2004 |
| JP | A-2006-201603 | 8/2006 |

(Continued)

*Primary Examiner* — Ariel Balaoing
*Assistant Examiner* — Darlene M Ritchie
(74) *Attorney, Agent, or Firm* — Oliff PLC

(57) ABSTRACT

An electronic paper includes: a first substrate which is provided with a plurality of first electrodes; a wiring which applies a voltage to the plurality of first electrodes; a plurality of light receiving elements which are respectively provided between the plurality of first electrodes and the wiring; a second substrate which is arranged to be opposite the first substrate and is provided with a second electrode; an electrophoretic display layer which is arranged between the first substrate and the second substrate; and a light guidance unit which is arranged between the first substrate and the second substrate, and is configured to guide light incident upon the second substrate to the relevant light receiving elements.

5 Claims, 7 Drawing Sheets

(56) References Cited

FOREIGN PATENT DOCUMENTS

| JP | A-2007-316248 | 12/2007 |
| JP | A-2008-164738 | 7/2008 |
| JP | A-2010-102079 | 5/2010 |
| JP | A-2011-99948 | 5/2011 |

* cited by examiner

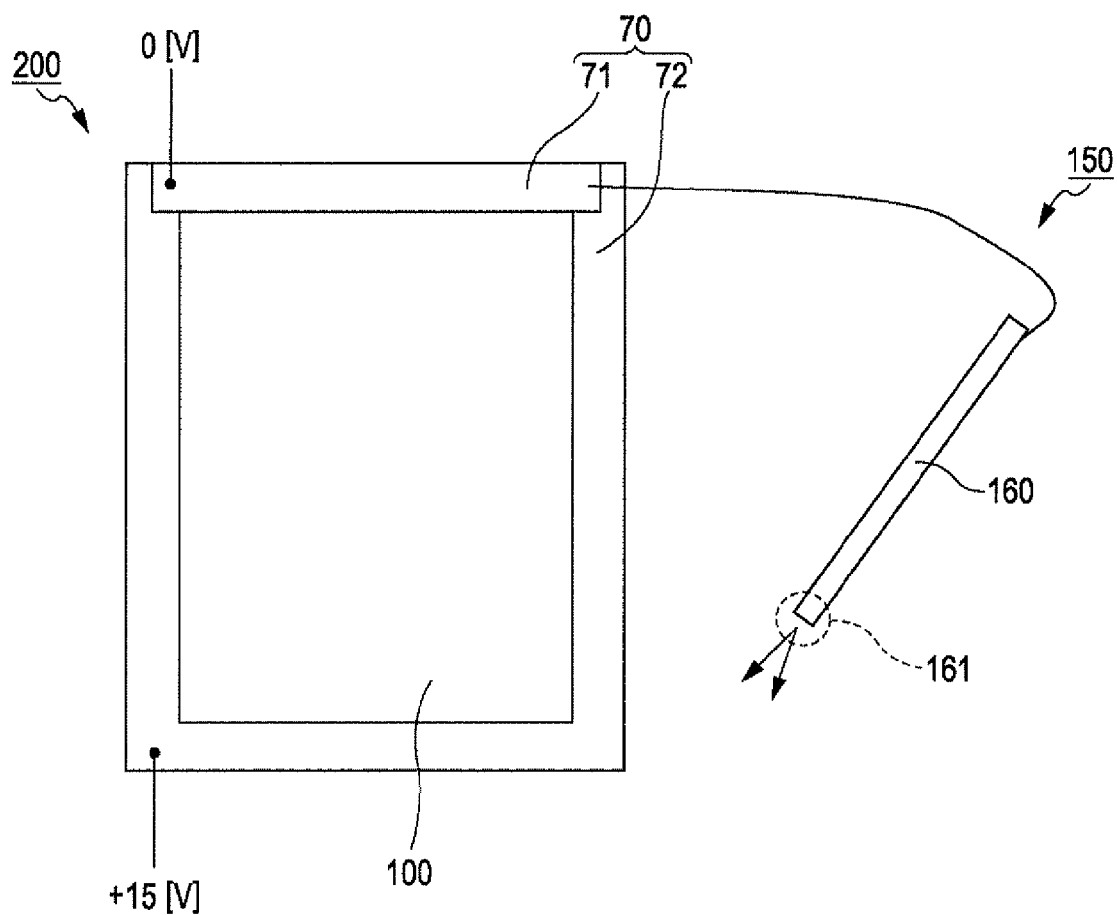

ELECTRONIC PAPER AND ELECTRONIC PAPER RECORDING SYSTEM USING LIGHT RECEIVING ELEMENTS

BACKGROUND

1. Technical Field

The present invention relates to an electronic paper, an electronic paper recording system, and a writing apparatus.

2. Related Art

As such a type of related art, there is, for example, JP-A-2011-99948. That is, JP-A-2011-99948 discloses an electronic paper capable of electrically recording images without using a Thin Film Transistor (TFT) and capable of maintaining images without using electric power.

The electronic paper includes an electronic ink layer, a surface film provided on the upper surface side of the electronic ink layer, a reverse surface film provided on the lower surface side of the electronic ink layer, a plurality of pixel electrodes interposed between the electronic ink layer and the surface film, and a common electrode interposed between the electronic ink layer and the reverse surface film.

A plurality of through-holes are formed in the surface film and a plurality of upper side through-hole electrodes which are respectively and electrically connected to the plurality of pixel electrodes are provided in each of the through-holes. In addition, at least one through-hole is formed in the reverse surface film, and a lower side through-hole electrode which is electrically connected to the common electrode is provided in the through-hole. Further, it is possible to move a black particle group and a white particle group in the opposite direction in a microcapsule by applying voltage between the upper side through-hole electrodes and the lower side through-hole electrode. Therefore, it is possible to display a desired image.

However, in the technology disclosed in JP-A-2011-99948, it is necessary to provide upper side through-hole electrodes (that is, a terminal area) in the surface film side (that is, a display surface side). The terminal area is positioned on the microcapsule. Therefore, the microcapsule is partially shielded by the terminal area. In addition, the terminal area protrudes toward the display surface side, so that unevenness is generated on the display surface. Therefore, in the related art, there is a possibility that the reflectivity of the display surface is lowered and the visibility of an image is damaged.

SUMMARY

An advantage of some aspects of the invention is to provide an electronic paper in which the unevenness of a display surface side is small and the visibility of an image is high, an electronic paper recording system which includes the electronic paper, and an image writing apparatus corresponding to the electric paper.

According to an aspect of the invention, there is provided an electronic paper including: a first substrate which is provided with a plurality of first electrodes; wiring which applies a voltage to each of the plurality of first electrodes; a plurality of light receiving elements which are respectively provided between the plurality of first electrodes and the wiring; a second substrate which is arranged to be opposite the first substrate and is provided with a second electrode; an electrophoretic display layer which is arranged between the first substrate and the second substrate; and a light guidance unit which is arranged between the first substrate and the second substrate, and is configured to guide light incident upon the second substrate to the relevant light receiving element. Each of the plurality of light receiving elements causes electricity to be conducted between each of the plurality of first electrodes and the wiring by detecting light led using the light guidance unit.

With this configuration, light which is incident upon the second substrate (for example, convergent light which is irradiated from the light irradiation apparatus, such as a pen input apparatus and a line light source, and is incident upon the second substrate) passes through the light guidance unit, and reaches the light receiving element corresponding to a light incident position. When the light receiving element detects light reception, electricity is conducted between the first electrode, connected to the light receiving element, and the wiring (that is, an electrically connected state). Therefore, a voltage can be applied to only the first electrode which is conductively connected to the wiring from the outside.

By applying a voltage from the outside, the electrophoretic display layer can switch the display of pixels corresponding to a light irradiation location without using a driving circuit such as a TFT. In addition, the electrophoretic display layer can maintain a switched image without using electric power (that is, in the state in which a voltage is not applied to the first electrodes). Compared to the related art, a terminal area, such as through-hole electrodes, is not necessary. Therefore, it is possible to reduce the unevenness of the display surface side (that is, a surface which is opposite a surface facing the electrophoretic display layer of the second substrate), so that it is possible to increase the visibility of an image which is displayed on the electrophoretic display layer.

Meanwhile, for example, pixel electrodes 12 which will be described later correspond to the "first electrodes" of the invention and a backplane 10 which will be described later corresponds to the "first substrate". For example, a common electrode 22 which will be described later corresponds to the "second electrode", and a counter substrate 20 which will be described later corresponds to the "second substrate". For example, an EPD layer which will be described later corresponds to the "electrophoretic display layer". For example, a barrier wall unit 31 or a support 32 which will be described later corresponds to the "light guidance unit".

In addition, in the electronic paper, each of the plurality of light receiving elements may be arranged in the surrounding area of each of the plurality of first electrodes. With this configuration, the light receiving element which switches the applied voltage to each pixel on or off is arranged around each pixel. Therefore, it is possible to almost match a light incident position with the location of a pixel, the display of which is switched by receiving the incident light. For example, when a user writes an image on the electrophoretic display layer through the second substrate using a pen input apparatus used to irradiate convergent light, it is possible to almost match the writing location with a location in which the image is switched according to the writing.

In addition, in the electronic paper, the electrophoretic display layer may include: a barrier wall unit which divides a space between the first substrate and the second substrate into a plurality of enclosed spaces; and a dispersion liquid which is filled into the enclosed spaces and includes a plurality of electrophoretic particles. The barrier wall unit may function as the light guidance unit. With this configuration, the light guidance unit and the light receiving element are arranged around each pixel. Since the arrangement locations of the light guidance unit and the light receiving element are comparatively widely secured, it is possible to increase light reception sensitivity (that is, sensitivity used to write or remove an image).

According to another aspect of the invention, there is provided an electronic paper recording system including: the electronic paper; and a writing apparatus which is used to draw an image on the electronic paper. The writing apparatus includes: a voltage applying apparatus which applies a voltage to the wiring included in the first substrate; and a light irradiation apparatus which irradiates light which can be detected using the light receiving elements from the side of the second substrate to the electronic paper. With this configuration, light irradiated using the light irradiation apparatus is incident upon the second substrate, passes through the light guidance unit, and reaches the light receiving element corresponding to the light incident position. When the light receiving element detects light reception, electricity is conducted between the first electrode, connected to the light receiving element, and the wiring. The voltage applying apparatus applies a voltage to only the first electrode which is conductively connected to the wiring.

Therefore, the electronic paper can switch the display of pixels corresponding to the light irradiation location without using a driving circuit such as a TFT or the like. In addition, the electronic paper can maintain the switched image without using electric power. Compared to the related art, it is not necessary to install a terminal area which protrudes toward the display surface side of the electronic paper in order to perform writing on the electronic paper. Therefore, the electronic paper can reduce the unevenness of the display surface side, so that it is possible to increase the visibility of an image on the display surface side. In addition, the writing apparatus can draw a desired image on the electronic paper in which the unevenness of the display surface side is small and the visibility of the image is high.

According to still another aspect of the invention, there is provided a writing apparatus which is used to draw an image on the electrophoretic paper, the writing apparatus including: a voltage applying apparatus which applies a voltage to the wiring included in the first substrate; and a light irradiation apparatus which irradiates light which can be detected using the light receiving elements from the side of the second substrate to the electronic paper. With this configuration, the unevenness of the display surface side is small, so that it is possible to draw a desired image on the electronic paper in which the visibility of the image is high.

BRIEF DESCRIPTION OF THE DRAWINGS

The invention will be described with reference to the accompanying drawings, wherein like numbers reference like elements.

FIG. 6 is a view illustrating a configuration example of an electronic paper recording system according to an embodiment.

DESCRIPTION OF EXEMPLARY EMBODIMENTS

Figure 1:
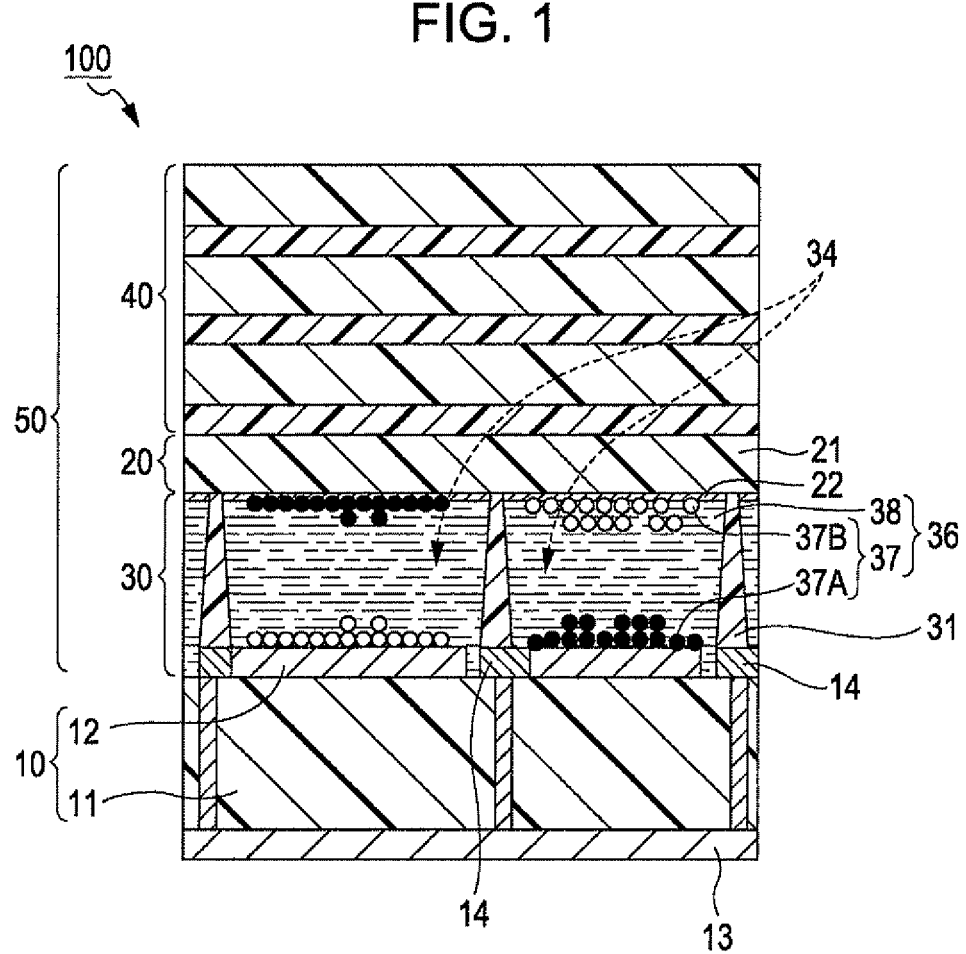
FIG. 1 is a view illustrating a configuration example of an electronic paper according to an embodiment.

Hereinafter, embodiments of the invention will be described with reference to the accompanying drawings. Meanwhile, the same reference numerals indicate the same components throughout the drawings which will be described below, and duplicated description will be omitted.

1. Electronic Paper 1.1. Configuration

FIG. 1 is a view illustrating a configuration example of an electronic paper 100 according to an embodiment of the invention.

The electronic paper 100 shown in FIG. 1 is an electrophoretic display apparatus, and includes, for example, a backplane 10, a wiring 13, a plurality of light receiving elements 14, a counter substrate 20 which is arranged to be opposite the backplane 10, a barrier wall-type Electrophoretic Display (EPD) layer 30 which is arranged between the backplane 10 and the counter substrate 20, and moisture membrane 40 which is arranged on the counter substrate 20 (that is, on the surface of the counter substrate 20, which is opposite the surface facing the backplane 10).

Figure 3:
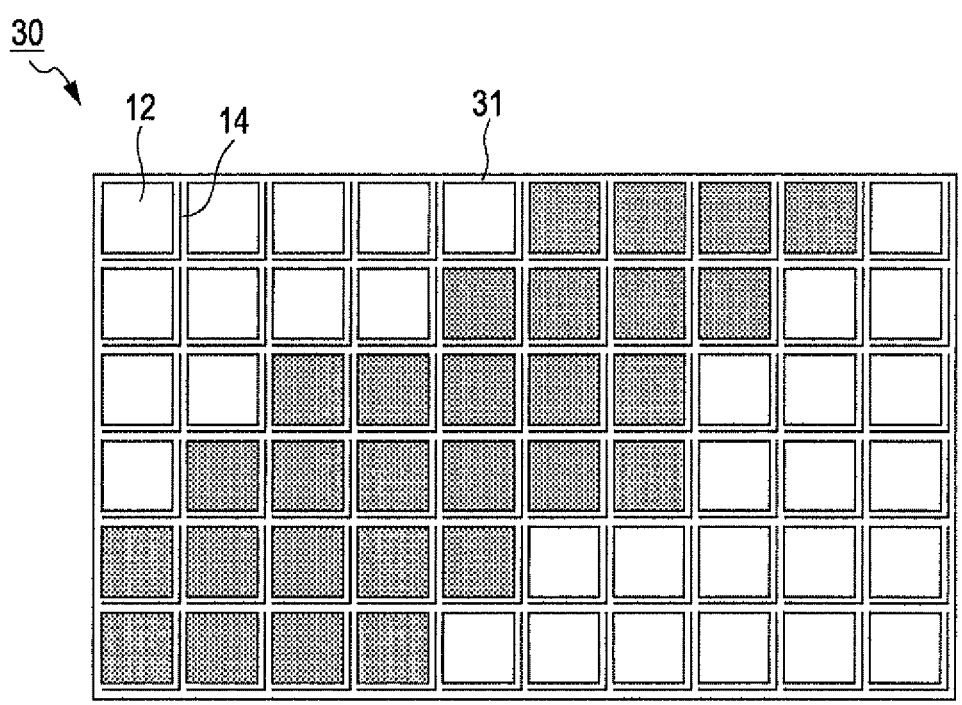
FIG. 3 is a view illustrating a first configuration example of an EPD layer.

The backplane 10 includes, for example, a substrate 11 and a plurality of pixel electrodes 12. A substrate 11 is formed of an insulating resin, for example, Polyethylene terephthalate (PET), polyethylenenaphthalate (PEN), or the like. Each of the plurality of pixel electrodes 12 is formed on one surface (for example, upper surface) of the substrate 11 at a regular interval. In this example, a single pixel electrode 12 surrounded by a barrier wall unit configures a single pixel. Meanwhile, as shown in FIG. 3, the shape of the pixel electrode 12 viewed from a plane (hereinafter referred to as "planar shape") is square. Or, the planar shape of the pixel electrode 12 may be a polygon, such as a triangle or a pentagon, or may be a circle. A wiring 13 is formed such that the wiring 13 reaches the upper surface from the other surface of the substrate 11 (for example, a lower surface). The wiring 13 is provided to apply voltage to each of the plurality of pixel electrodes 12.

Figure 8:
FIG. 8 is a view illustrating a first configuration example of a light receiving element.
Figure 9:
FIG. 9 is a view illustrating a second configuration example of the light receiving element.

Each of the plurality of light receiving elements 14 includes, for example, a photodiode as shown in FIG. 8 or a phototransistor as shown in FIG. 9. The structure of the photodiode may be a PN-type or a PIN type. In this example, at least one light receiving element 14 is formed between a single pixel electrode 12 and the wiring 13. In addition, each of the plurality of light receiving elements 14 is arranged around each of the plurality of pixel electrodes 12. For example, when the planar shape of the pixel electrode 12 is square as shown FIG. 3, the light receiving element 14 is arranged along two sides of the square which are perpendicular to each other (that is, the planar shape is shaped in the formed of the letter "L"). Meanwhile, although not shown in the drawing, the backplane 10 includes an external connection terminal unit used to apply voltage to the wiring 13.

The counter substrate 20 includes a substrate 21 and a common electrode 22 formed on one surface of the substrate 21 (for example, a lower surface). The substrate 21 is formed of, for example, a flexible insulating resin. Such a resin may be, for example, acrylic resin, polyester resin, polyolefin resin, polycarbonate resin, polyimide resin, or the like. The common electrode 22 is formed of, for example, a conductive inorganic substance, such as ITO, zinc oxide, metal fine particles, metallic foil or the like, or a conductive organic substance, such as polyacetylene, polyaniline, polypyrrole, polyethylenedioxythiophene, polythiophene, or the like. Meanwhile, although not shown in the drawing, the counter substrate 20 includes an external connection terminal unit which is used to apply voltage to the common electrode 22.

The EPD layer 30 includes barrier wall units 31 and a dispersion liquid 36. Each of the barrier wall units 31 is arranged between the backplane 10 and the counter substrate 20, and divides a space between the backplane 10 and the counter substrate 20 into enclosed regions (that is, cells) 34. That is, the barrier wall units 31 are used to divide the EPD layer 30 into a plurality of display regions. As an example, the pixel electrodes 12 are respectively arranged in the plurality of cells 34 one by one. Such a barrier wall unit 31 is formed of a material, for example, epoxy resin, acrylic resin, urethane resin, melamine resin, phenol resin, or the like. In addition, as described below, the barrier wall unit 31 is formed of, for example, a transparent, colorless material or a transparent, colored material. Each of the plurality of cells 34, obtained through division using the barrier wall units 31, is charged with the dispersion liquid 36. The dispersion liquid 36 includes a plurality of electrophoretic particles 37 and a dispersion medium 38 which disperses the electrophoretic particles 37. The electrophoretic particles 37 are, for example, positively or negatively charged. In this example, the electrophoretic particles 37 include black particles 37A and white particles 37B. One of the black particles 37A and the white particles 37B is positively charged and the other one is negatively charged.

The moisture membrane 40 prevents moisture from permeating into the electronic paper 100 from the side of the counter substrate 20 (that is, the upper side in FIG. 1). The moisture membrane 40 has a structure in which, for example, acrylic resin or another resin is laminated in a single layer or alternately laminated. Meanwhile, an image, letter, symbol, or the like displayed on the EPD layer 30 is viewed from, for example, the side of the counter substrate 20. When an image or the like is viewed from the side of the counter substrate 20, it is necessary that the substrate 21 and the common electrode 22, which are included in the counter substrate 20, and the moisture membrane 40 should be formed of transparent, colorless material or a transparent, colored material and which enables visible rays to pass therethrough. The counter substrate 20, the EPD layer 30, and the moisture membrane 40 are called a front plane 50.

The electronic paper 100 is formed in a standard size (A3, A4, A5, or the like), like recording paper including, for example, paper in the related art or the like.

However, in the electronic paper 100, the barrier wall unit 31 is, for example, colorless and transparent (or, colored and transparent), and functions as a light guidance unit which guides light incident upon the counter substrate 20 to the side of the backplane 10. Further, each of the light receiving elements 14 is arranged immediately below the barrier wall unit (that is, the light guidance unit) 31. That is, the barrier wall unit 31 is arranged immediately above each of the plurality of light receiving elements 14. Light incident from the side of the counter substrate 20 passes through the barrier wall unit 31, and reaches the light receiving element 14 which is located immediately below the barrier wall unit 31. If the amount and wavelength of light which reached the light receiving element 14 can be detected using the light receiving element 14, the light receiving element 14 converts light into electrical energy (that is, light conversion), so that photoelectric current is generated.

For example, when the light receiving element 14 is a photodiode as shown in FIG. 8, photoelectric current flows from an anode to a cathode. In addition, when the light receiving element 14 is a phototransistor as shown in FIG. 9, photoelectric current is input to a base and amplified, thereby flowing as collector current. In any case, the light receiving element 14 functions as a switching element which triggers the generation of photoelectric current. When photoelectric current is generated in the light receiving element 14 and the light receiving element 14 is switched on, electricity is conducted between the wiring 13 and the pixel electrode 12. Meanwhile, the sensitivity of the light receiving element 14 is set such that the light receiving element 14 does not react to natural light (daily light).

1.2. Operation

Next, the operation of the electronic paper 100 which is performed when an image is drawn on the EPD layer 30 will be described.

Figure 2:
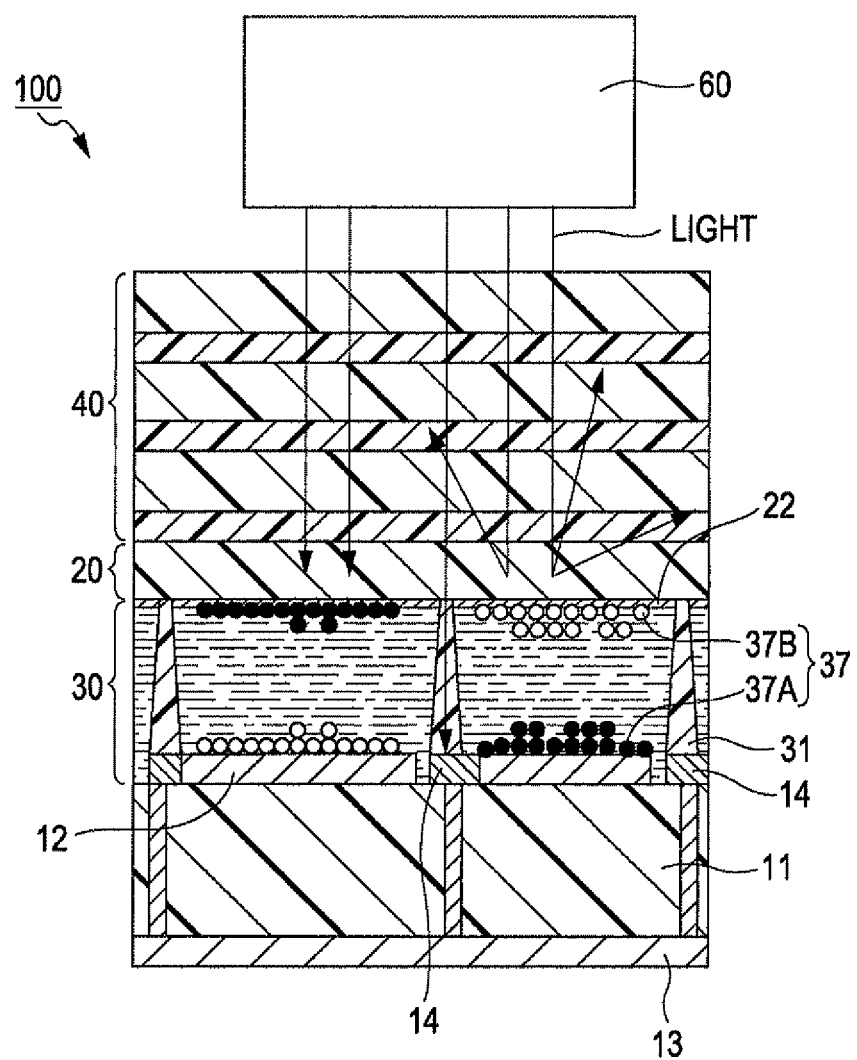
FIG. 2 is a view illustrating a state when the electronic paper according to an embodiment performs writing.

FIG. 2 is a cross sectional view illustrating the state in which the electronic paper 100 according to the embodiment of the invention performs a writing operation. As shown in FIG. 2, an image is drawn on the EPD layer 30 of the electronic paper 100 using, for example, a light irradiation apparatus 60 which irradiates light in one direction. Light irradiated using the light irradiation apparatus 60 (that is, light having directivity) is light to which the light receiving element 14 reacts (that is, detects), and, for example, convergent light converged in such a way that visible light passes through a lens, or laser light obtained by amplifying visible light. In addition, light is not limited to visible light and may be light of short wavelength such as ultraviolet rays or light of long wavelength such as infrared rays.

In addition, when an image is drawn on the EPD layer 30, a voltage, the magnitude of which is preset (for example, +15 V), is applied to the wiring 13 of the backplane 10. In addition, for example, 0 V is applied to the common electrode 22. Such a voltage is applied using an external voltage applying apparatus. In the state in which a voltage of +15 V is applied to the wiring 13 and a voltage of 0 V is applied to the common electrode 22, the light irradiation apparatus 60 approximates to the upper portion of the electronic paper 100. As a result, light irradiated using the light irradiation apparatus 60 passes through the moisture membrane 40, is incident upon the counter substrate 20, passes through the barrier wall unit 31, and reaches the light receiving element 14 which is arranged immediately below the barrier wall unit 31. The light receiving element 14 performs photoelectric conversion on light, so that photoelectric current is generated. Therefore, electricity is conducted between the pixel electrode 12 and the wiring 13, and a voltage of +15 V is applied to the pixel electrode 12.

Because of the electric field between the pixel electrode 12 and the common electrode 22, for example, the positively charged black particles 37A migrate toward the side of a common substrate, and the negatively charged white particles 37B migrate toward the side of the pixel electrode 12. As a result, when the electronic paper 100 is viewed from the side of the counter substrate 20, black color is displayed on the EPD layer 30. The black color display can be maintained without using electric power even after the writing of the light irradiation apparatus 60 is stopped and the voltage applying apparatus is separated from the electronic paper 100.

In addition, when the image displayed on the EPD layer 30 is removed, for example, 0 V is applied to the wiring 13 and +15 V is applied to the common electrode 22. In this state, light which can be detected using the light receiving element 14 is irradiated to the entire surface of the electronic paper 100. Therefore, in each pixel of the EPD layer 30, electricity is conducted through the wiring 13 and the pixel electrode 12, the positively charged black particles 37A migrate toward the side of the pixel electrode 12, and the negatively charged white particles 37B migrate toward the side of the common electrode 22. As a result, when the electronic paper 100 is viewed from the side of the counter substrate 20, white color is displayed on the entire surface of the EPD layer 30 (that is, plain white state). In the plain white state, the white color display can be maintained without using electric power even after the writing of the light irradiation apparatus 60 is terminated and the voltage applying apparatus is separated from the electronic paper 100.

Meanwhile, a light irradiation region obtained using the light irradiation apparatus 60 shown in FIG. 2 is approximately proportional to the thickness of the line of the image displayed on the EPD layer 30. Therefore, when a user views a line displayed on the EPD layer 30, it is preferable that the light irradiation region obtained using the light irradiation apparatus 60 be set to the size of a degree of several tens of pixels of the EPD layer 30. That is, when the light irradiation apparatus 60 relatively moves on the electronic paper 100 while irradiating light, a black colored line is written on the EPD layer 30 along the track of the movement. Here, if the light irradiation region corresponds to the size of a degree of several tens of pixels of the EPD layer 30, the width of the line written on the EPD layer 30 has the size of a degree of several tens of pixels like he light irradiation region. Therefore, a user can visually observe (that is, can be visible with the naked eyes) the black colored line written on the EPD layer 30.

The black colored line can be maintained without using electric power even after the writing of the light irradiation apparatus 60 is terminated and the voltage applying apparatus is separated from the electronic paper 100.

1.3. Modification Example

The invention can be applied to the electronic paper 100 including the EPD layer 30 which is not a barrier wall-type. In this case, for example, a plurality of supports arranged in order to maintain the space between the backplane 10 and the counter substrate 20 may be used as the light guidance unit.

Figure 4:
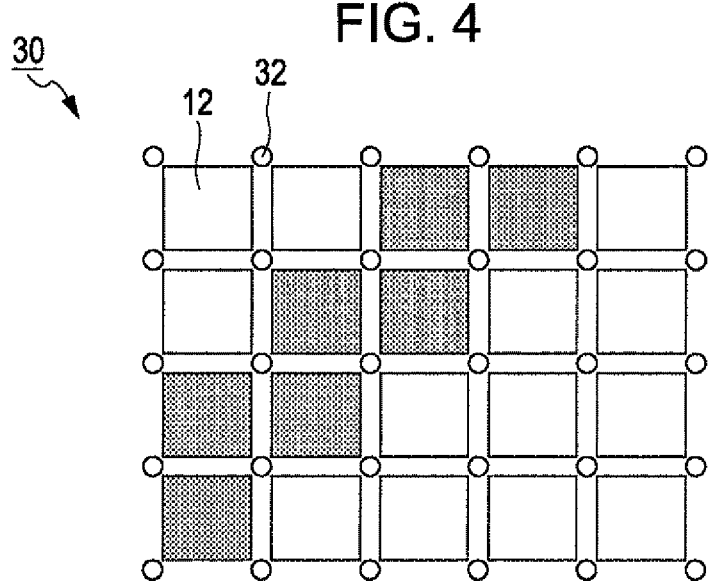
FIG. 4 is a view illustrating a second configuration example of the EPD layer.

For example, as shown in FIG. 4, each of the plurality of supports 32 is arranged so as to be adjacent to the corner of the pixel electrode 12 the planar shape of which is square. The plurality of supports 32 is formed of, for example, a transparent, colorless material or a transparent, colored material. In addition, the light receiving element 14 is arranged immediately below each of the plurality of supports 32. Even in this configuration, light incident from the side of the counter substrate 20 passes through the support 32 and reaches the light receiving element 14 which is located immediately below the support 32. Therefore, an image can be drawn on the EPD layer 30 as the same as the shape shown in FIG. 3.

Figure 5:
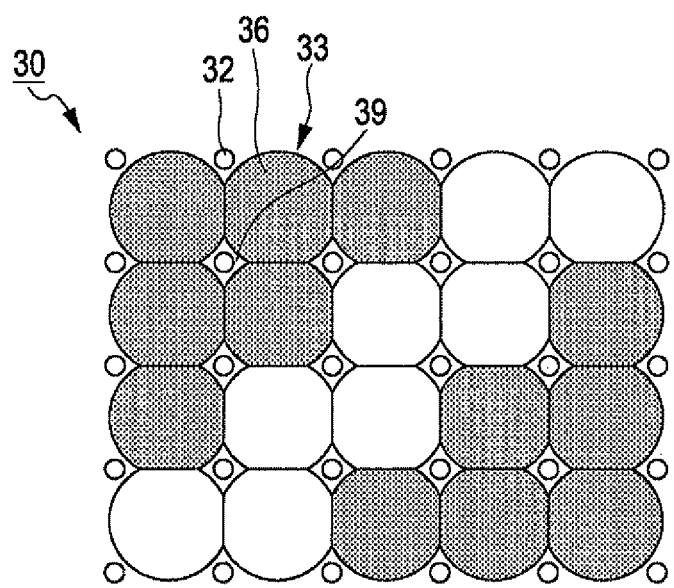
FIG. 5 is a view illustrating a third configuration example of the EPD layer.

In addition, the invention can be applied to the microcapsule-type EPD layer 30. Here, the microcapsule-type EPD layer 30 includes, for example, a plurality of microcapsules 33 and transparent binders 39 through which visible light passes as shown in FIG. 5, and dispersion liquid 36 is filled inside of each of the plurality of microcapsules 33. In the microcapsule-type EPD layer 30, the support 32 is arranged in the space between the adjacent microcapsules 33 as shown in FIG. 5. Further, the light receiving element 14 is arranged immediately below the support 32. Even with this configuration, an image can be drawn on the microcapsule-type EPD layer 30 as the same as the shapes shown in FIGS. 3 and 4.

Figure 10:
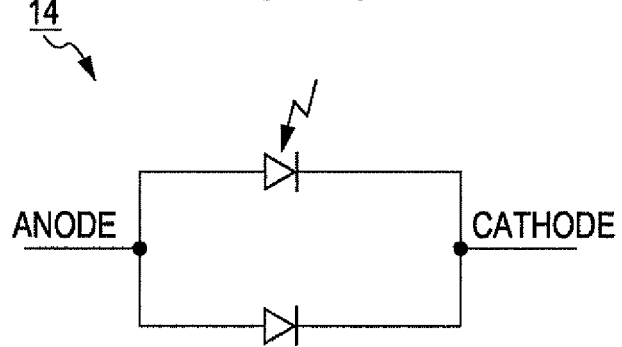
FIG. 10 is a view illustrating a third configuration example of the light receiving element.

In addition, in the invention, the light receiving element 14 may be configured with a photodiode and a diode as shown in FIG. 10. A photodiode and a diode are connected in parallel. This parallel circuit functions as the light receiving element 14 and is arranged between the wiring 13 and the pixel electrode 12. With this configuration, a predetermined voltage is applied to the pixel electrode 12 via the diode. Therefore, it is possible to increase the adjustable width of the voltage which is applied to the pixel electrode 12.

2. Electronic Paper Recording System

2.1. Configuration

FIG. 6 is a conceptual diagram illustrating a configuration example of an electronic paper recording system 200 according to an embodiment of the invention. As shown in FIG. 6, the electronic paper recording system 200 includes the above-described electronic paper 100 and a writing apparatus 150 which is used to draw an image on the electronic paper 100. In addition, the writing apparatus 150 includes a light irradiation apparatus 160 and a voltage applying apparatus 70.

The light irradiation apparatus 160 has a pen shape such that a user easily grips the light irradiation apparatus 60 shown in FIG. 2. The pen-shaped light irradiation apparatus 160 includes a light source 161 on the tip thereof. In addition, light irradiated from the light source 161 has directivity, and a light irradiation region corresponds to, for example, the size of a degree of several tens of pixels of the EPD layer 30. In addition, light irradiated from the light source 161 is set such that the amount and wavelength of light can be detected using the light receiving element 14.

The voltage applying apparatus 70 applies a voltage (for example, +15 V) to the wiring 13 of the backplane 10. The voltage applying apparatus 70 has a clip board (that is, a writing board to which a metal fittings used to fasten documents) shape. The clip 71 of the voltage applying apparatus 70 presses the end of the electronic paper 100 against a board 72. Therefore, an external connection terminal unit provided in the counter substrate 20 of the electronic paper 100 is connected to the clip 71. In addition, the external connection terminal unit provided in the backplane 10 of the electronic paper 100 is connected to the board 72.

2.2. Operation

Next, an example of the operation of the electronic paper recording system 200 shown in FIG. 6 will be described. First, the electronic paper 100 is inserted and fixed to the voltage applying apparatus 70, the clip 71 of the voltage applying apparatus 70 is connected to the external connection terminal unit which is provided in the counter substrate 20, and the board 72 of the voltage applying apparatus 70 is connected to the external connection terminal unit which is provided in the backplane 10. Next, the voltage of the clip 71 is set to, for example, 0 V, and the voltage of the board is set to +15 V. Therefore, +15 V is applied to the wiring 13 and 0 V is applied to the common electrode 22.

Under such a setting, a user draws an arbitrary image on the electronic paper 100 using the pen-shaped light irradiation apparatus 160. Then a black colored line is written on the EPD layer 30 along the track of the drawing. The width of the line written on the EPD layer 30 has, for example, the size of a degree of several tens of pixels, so that the user can visually observe the black colored line written on the EPD layer 30. The black colored line can be maintained without using electric power even after the writing of the light irradiation apparatus 160 is terminated and the voltage applying apparatus 70 is separated from the electronic paper 100.

In addition, when the image drawn on the EPD layer 30 is removed, for example, the electrical potential of the clip 71 is set to +15 V and the electrical potential of the board is set to 0 V while the electronic paper 100 is maintained using the voltage applying apparatus 70. In this state, light which can be detected using the light receiving element 14 is irradiated on the entire surface of the electronic paper 100. Therefore, in each of the pixels of the EPD layer 30, the positively charged black particles 37A migrate toward the side of the pixel electrode 12 and the negatively charged white particles 37B migrate toward the side of the common electrode 22. As a result, when the electronic paper 100 is viewed from the side of the counter substrate 20, the electronic paper 100 is the plain white state. That is, the image drawn on the electronic paper 100 is removed. The plain white state can be maintained without using electric power even after the light irradiation apparatus 160 terminates the writing and the voltage applying apparatus 70 is separated from the electronic paper 100.

2.3. Modification Example

Figure 7A:
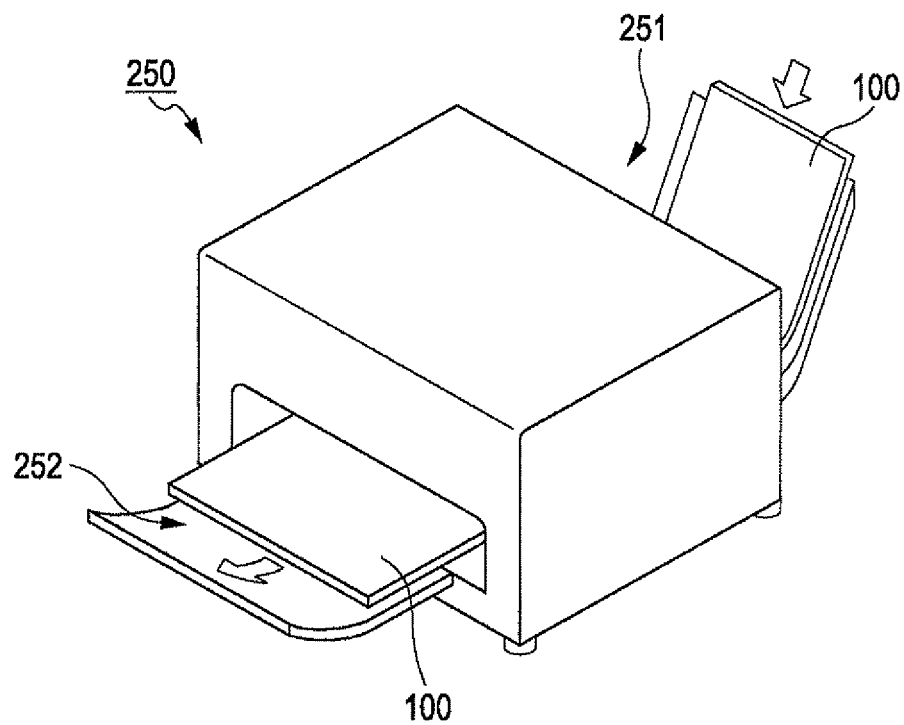
FIGS. 7A and 7B are views illustrating configuration examples of a writing apparatus according to an embodiment.
Figure 7B:
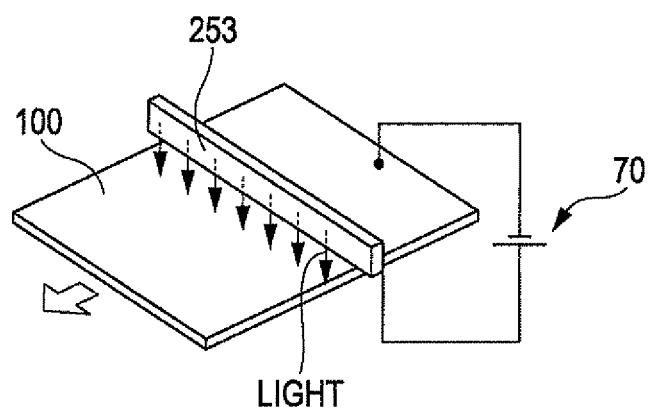

In the invention, the writing apparatus is not limited to the pen type. For example, the writing apparatus may be a printer-type as shown in FIGS. 7A and 7B. As shown in FIG. 7A, in the printer-type writing apparatus 250, the electronic paper 100 is sent from the paper feeding opening 251 of a printer, and the electronic paper 100 is sent out from the paper ejecting opening 252 of the printer. As shown in FIG. 7B, in the inside of the writing apparatus 250, there are provided, for example, a line light source 253, in which a plurality of light sources are provided in a row in the width direction of the electronic paper 100, and a voltage applying apparatus 70 which applies a voltage to the electronic paper 100.

In the printer-type writing apparatus 250, 0 V is applied to the common electrode 22 of the electronic paper 100 and +15 V is applied to the wiring 13. In this state, the electronic paper 100 is sent out from the paper feeding opening 251 to the paper ejecting opening 252, and light is selectively irradiated immediately below the line light source 253. Therefore, it is possible to a predetermined image is drawn on the electronic paper 100.

In addition, +15 V is applied to the common electrode 22 of the electronic paper 100 and 0 V is applied to the wiring 13. In this state, the electronic paper 100 is sent out from the paper feeding opening 251 to the paper ejecting opening 252, and light is irradiated to the entire surface immediately below the line light source 253. Therefore, it is possible to maintain the electronic paper 100 in a plain white state. That is, it is possible to remove the image drawn on the electronic paper 100.

3. Effects of Embodiment

According to the embodiment, light irradiated using the light irradiation apparatus 60 is incident upon the counter substrate 20, passes through the barrier wall unit 31 for the support 32), and reaches the light receiving element 14 which is located immediately below the barrier wall unit 31. When the light receiving element 14 detects light, electricity is conducted between the pixel electrode 12 which is connected to the light receiving element 14 and the wiring 13. The voltage applying apparatus 70 applies a voltage to only pixel electrode 12 which is conductively connected with the wiring 13.

Therefore, the electronic paper 100 can switch the display of pixels corresponding to light incident positions without using a driving circuit such as a TFT. In addition, the electronic paper 100 can maintain the switched image without using electric power. Compared to the related art, it is not necessary to provide terminal units which protrude toward the side of the display surface of the electronic paper 100 in order to perform writing on the electronic paper 100. Therefore, it is possible to decrease the unevenness of the side of the display surface and to increase the visibility of an image on the side of the display surface.

In addition, compared to the related art, it is not necessary that the electronic paper 100 perform a complicated process of converting a writing position into coordinates and reflecting the coordinates to a display position when an image is being drawn. Light is used when an image is drawn, and light reaches the light receiving element 14 around the pixel of the writing position, thereby switching the display of the pixel. Therefore, it is possible to cause the speed of switching an image to be fast. The above-described electronic paper 100 has a sheet shape which is thin and light, and can be easily carried and freely recurved. Therefore, the electronic paper 100 can be applied to a flexible display or the like which has high degree of freedom with respect to an arrangement location or a usage pattern.

The entire disclosure of Japanese Patent Application No. 2011-188723, filed Aug. 31, 2011 is expressly incorporated by reference herein.

What is claimed is:

1. An electronic paper, comprising:
   a first substrate which is provided with a plurality of first pixel electrodes;
   a wiring which applies a voltage to the plurality of first pixel electrodes;
   a plurality of light receiving elements which are respectively provided between the plurality of first pixel electrodes and the wiring;
   a second substrate which is arranged to be opposite the first substrate and is provided with a second common electrode;
   an electrophoretic display layer which is arranged between the first substrate and the second substrate; and
   a barrier wall that is:
   arranged between the first substrate and the second substrate,
   immediately above the light receiving elements, and
   configured to guide light incident upon the second substrate to the relevant light receiving elements,
   wherein the plurality of light receiving elements detect light from a light irradiation apparatus led using the barrier wall, and control a conduction state between the plurality of pixel electrodes and the wiring, and
   wherein the wiring is on a side of the first substrate opposite to a side of the first substrate facing the second substrate such that during a writing operation electricity is conducted between the pixel electrodes and the wiring causing an electric field between the pixel electrodes and the common electrode to be generated such that the electrophoretic display layer can switch the display of pixels corresponding to the light irradiation location without using a driving circuit.

2. The electronic paper according to claim 1, wherein the plurality of light receiving elements are arranged in at least a part of a surrounding area of the plurality of first electrodes.

3. The electronic paper according to claim 1, wherein:
the barrier wall divides a space between the first substrate and the second substrate into a plurality of enclosed regions; and
a dispersion liquid is filled into the enclosed regions and is configured to include a plurality of electrophoretic particles.

4. An electronic paper recording system comprising:
the electronic paper according to claim 1; and
a writing apparatus which is used to draw an image on the electronic paper,
wherein the writing apparatus includes:
a voltage applying apparatus which applies a voltage to the wiring included in the first substrate; and
the light irradiation apparatus, wherein the light irradiation apparatus irradiates light which can be detected using the light receiving elements from a side of the second substrate to the electronic paper.

5. The electronic paper according to claim 1, wherein the light receiving elements are arranged around the first electrodes.

\* \* \* \* \*